April 30, 1968   J. S. COX   3,380,112
SHRIMP BUTCHERING APPARATUS
Filed Oct. 14, 1965   8 Sheets-Sheet 8
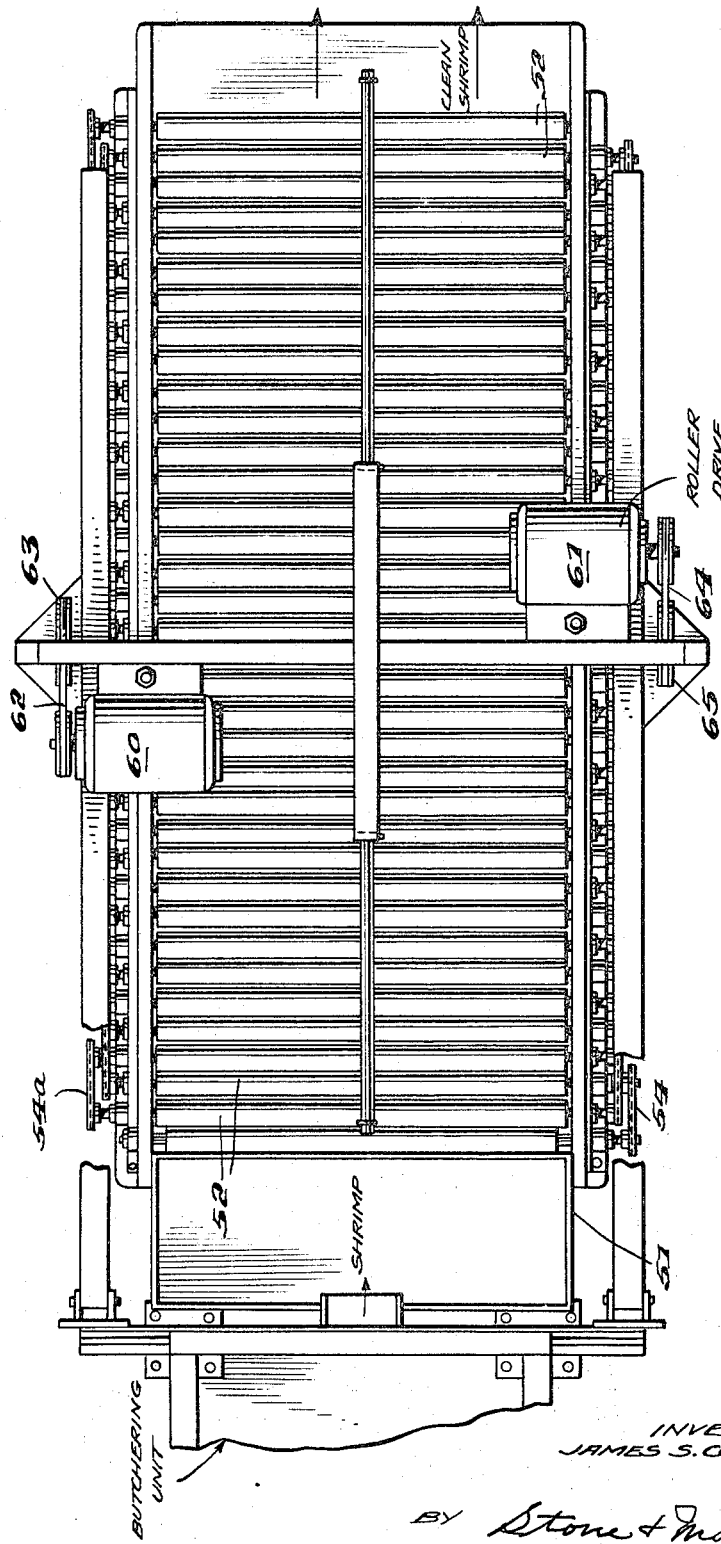

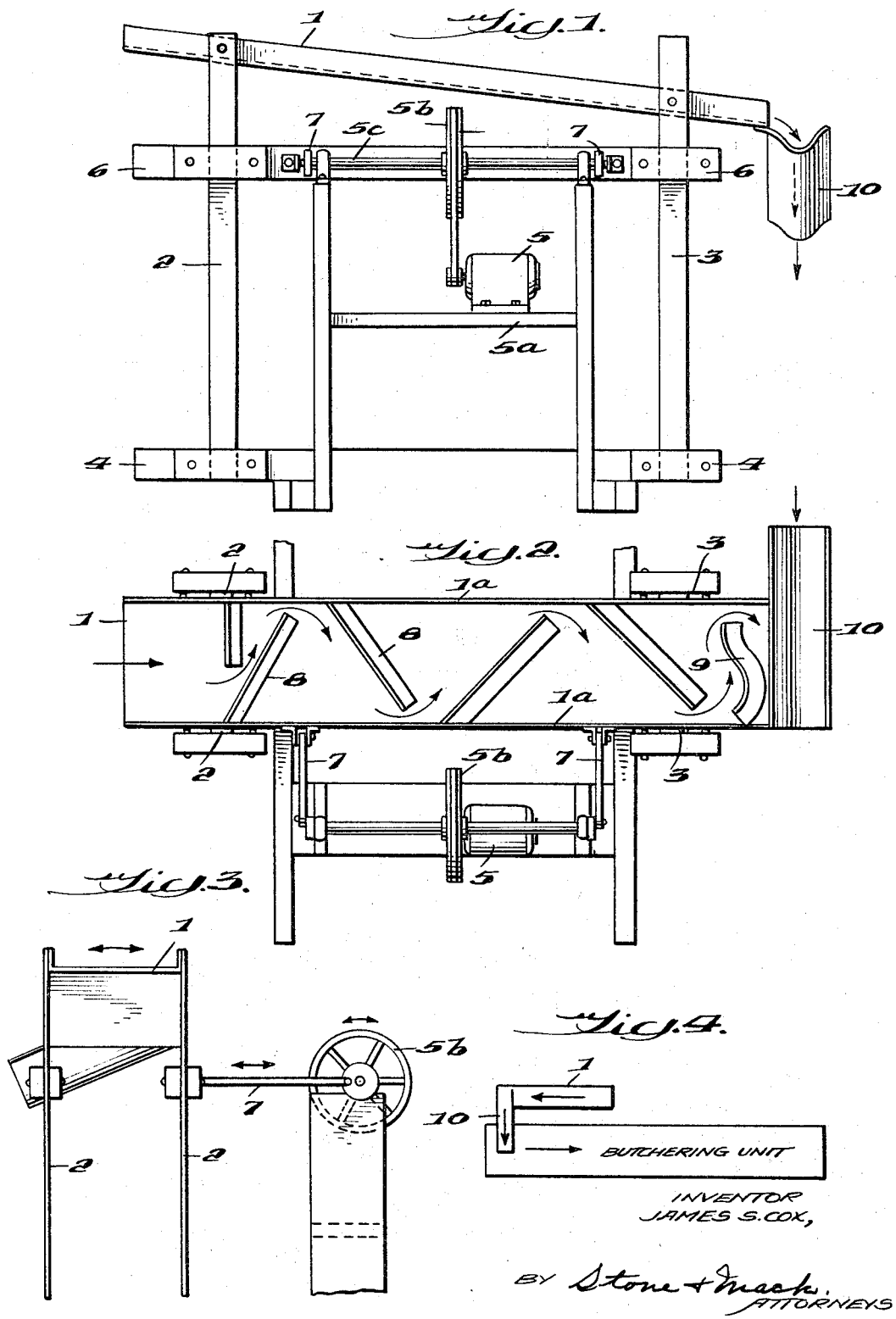

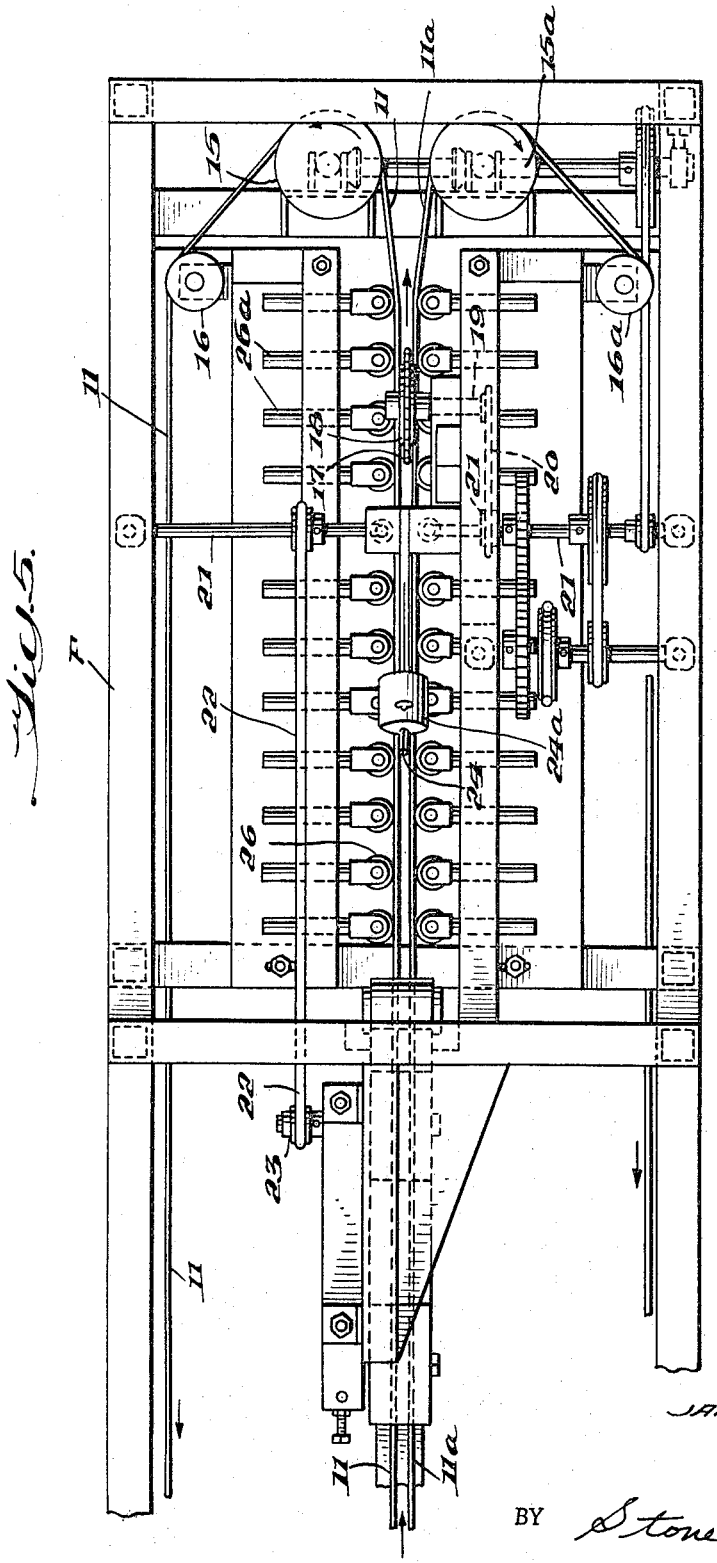

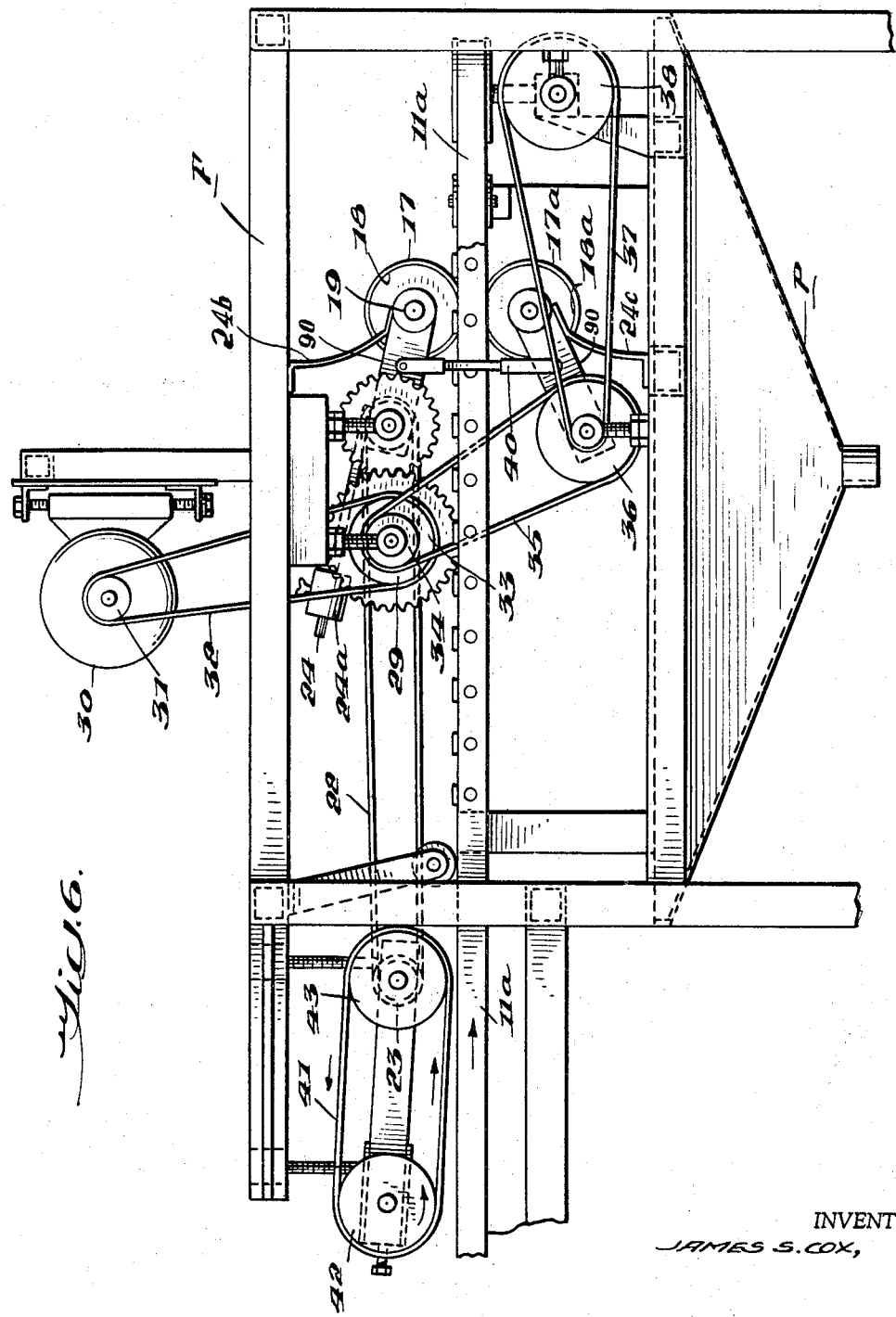

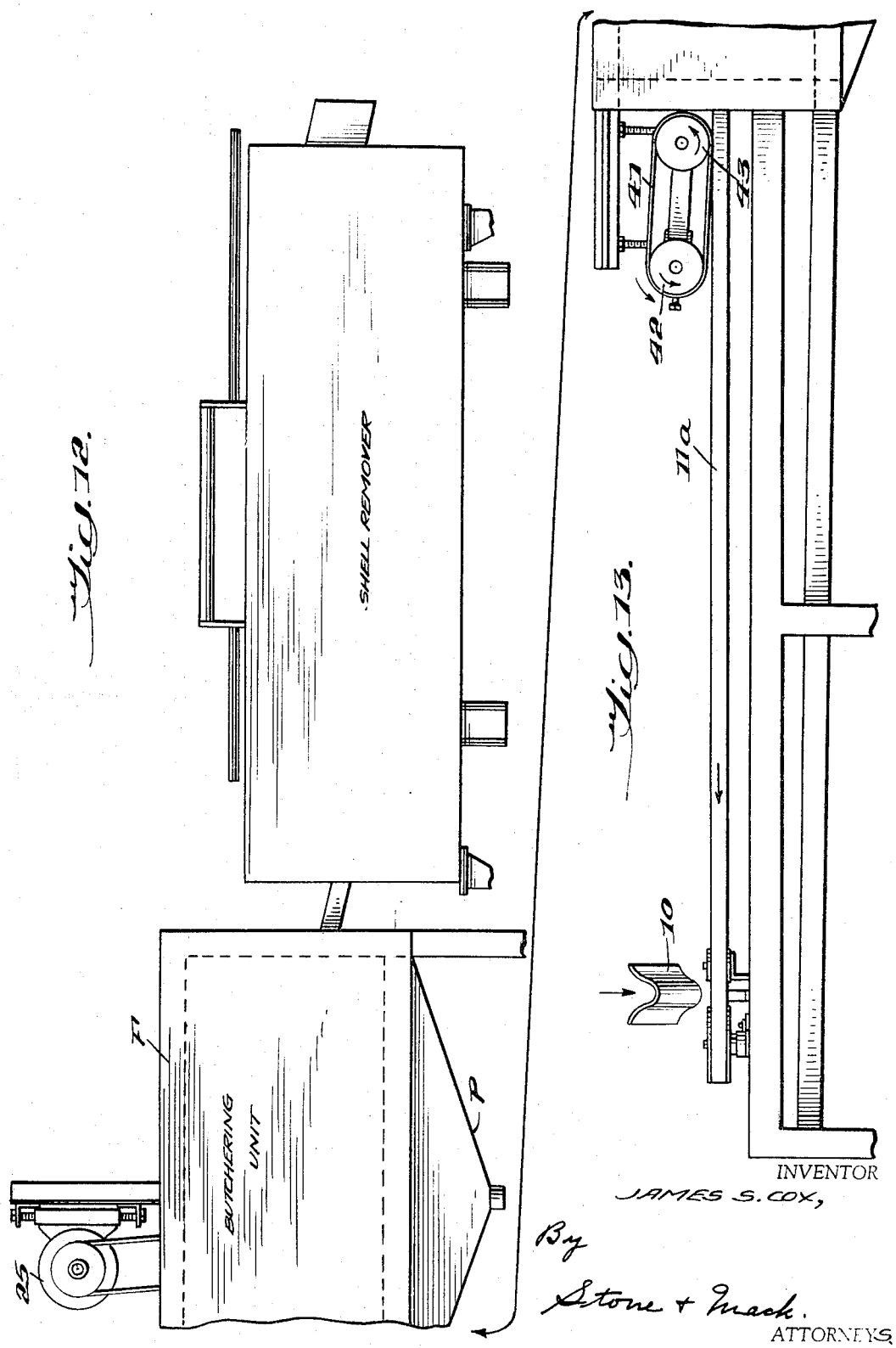

United States Patent Office 3,380,112
Patented Apr. 30, 1968

3,380,112
SHRIMP BUTCHERING APPARATUS
James S. Cox, 6431 Lily Dhu Lane,
Falls Church, Va. 22044
Filed Oct. 14, 1965, Ser. No. 495,800
3 Claims. (Cl. 17—2)

ABSTRACT OF THE DISCLOSURE

This invention relates to a method and apparatus for conducting the method of butchering green beheaded shrimp, one at a time, progressively through mechanism which serves to hold the individual shrimp in position for treatment by butchering knives after which the shrimp meat is separated from the shell and deveined material.

This invention relates to apparatus and to a method for preparing shrimp.

Heretofore the cleaning of shrimp and preparation for table use has been performed largely by hand. Each separate shrimp is beheaded on the shrimp boat or shortly after landing. The body is then treated to remove, by hand, the shell or hull and the so-called vein comprising the digestive tract. With the increase in use of shrimp, the business of preparing shrimp for the market has increased tremendously. Yet, thus far, the trade has been dependent on hand butchering and cleaning.

This new improvement provides for mechanical means for treating bulk amounts of shrimp individually and to a method of providing the steps whereby the shrimp are cleaned, all without hand manipulation.

The initial procedure involves the separation of bulk shrimp so that each shrimp is fed separately to a conveyor unit which carries the shrimp through the butchering steps. After butchering, the shrimp are treated on a series of rollers which serve to separate the shrimp meat from the waste hull or shell and deveined matter. Throughout the procedure the shrimp are sprayed with water to keep the shrimp slippery and to prevent stickiness at all stages of treatment.

The essentials of the apparatus and method are described in general as follows. The green headless shrimp are dropped on a separating table at the advance end of the equipment. This table is designed to vibrate and has baffle plates to separate and distribute the shrimp which slide down from the upper end of the table to the lower end where the shrimp passes one by one to a main conveyor belt which serves to carry the shrimp one at a time through the length of the butchering machine which splits the shell or hull longitudinally. This main belt is formed of two oppositely faced belts travelling side by side and between which the individual shrimp are held.

The shrimp can pass through the machine in only one of four possible positions, that is, back up, belly up, tail first, or head first. They will never rest on the main belts sideways. The two main belts run parallel and within ¾ inch of each other. There are two sets of rollers which push against the back of each belt and serve to bring them within ¼ inch of each other. These rollers are so designed as to expand with the rise and contour of each shrimp, thus centering it with the cutter blades. Near the forward end of these two sets of main conveyor belts there are two rollers set on a 45° angle against the backing of each belt, causing the belt to twist and thereby forming the V space for a short distance to receive shrimp from the chute. As the belts move along carrying the individual shrimp therebetween, they gradually straighten up into a vertical position as they pass through the two sets of rollers.

One small pulley and one large pulley with one inch facing equipped with one inch rough surface flat belt runs at high speed directly over the main conveyor belts. This small and large pulley structure sits directly above and almost touching the main conveyor belts. This combination is called the shrimp straightener. The larger pulley is facing the shrimp as they enter on the main conveyor belts. The purpose of this apparatus is to flatten the shrimp down quickly as they move along on the main conveyor belts. The reason for having the larger pulley at the advance side is to give it more height to catch a shrimp that might be standing up as it moves along.

A short distance away from the shrimp straightener are the cutter and deveiner blades. These blades are hard stainless steel and are very rigid. They are bevelled, thick in the middle, and tapered off to a sharp cutting edge with small saw type teeth. There are two cutter blades, one running directly above the other and both sets to operate midway between the two main conveyor belts and thus in position to operate on the upper and lower sides of a shrimp hull or shell. On both sides of each blade there is a floating wheel or disc just a little smaller than the cutting blade. These discs or floating wheels allow the cutter blade to cut into the shrimp the correct depth, leaving the discs to roll on the back or belly of the shrimp and thus preventing injury to the meat of the shrimp. These cutter blades are attached to arms that allow them to move upward or downward as may be necessary to follow the contour of the shrimp. However, when they come within a fraction of an inch of each other, two pistons permit them to open and close according to the size of the shrimp being cut. The cutter blades move very quickly under the action of the pistons which in turn are sensitive and move quickly due to the spring and the weight apparatus that controls them.

After each individual shrimp has been butchered according to the foregoing, it is carried to the end of the main conveyor belts where it is dumped on a trough which leads it to a cleaning apparatus consisting primarily of a series of rollers, preferably 32 in number arranged alongside of each other and in a horizontal plane. These rollers are mounted close together, substantially touching, and adjacent rollers are driven in opposite directions with the result that waste matter is separated from the shrimp meat and is drawn between the rollers to a catch pan therebeneath. The constant use of water sprays and which sprays are continued over the top of the rollers serves to keep the shrimp meat slippery so that it does not become caught between the rollers and is not drawn downward through the rollers. The rollers are provided with an intermittent bouncing action which serves to advance the shrimp upwardly and forwardly across the rollers to the discharge end.

The foregoing general features outline the gist of the apparatus and method of this improvement. The invention will be explained and claimed in detail when considered in connection with the accompanying drawings in which:

FIGURE 1 is a side elevation of the shrimp separating and feeding unit for passing shrimp individually to the butchering unit;

FIGURE 2 is a top plan view of the device shown in FIGURE 1 illustrating the inclined vibrating table with baffles on the upper surface thereof;

FIGURE 3 is an end view through the driving wheel of the vibrating apparatus of FIGURE 2 showing its connection to the two legs which support the vibrating table;

FIGURE 4 is a diagram showing the path of travel of the shrimp from the vibrating table to the butchering unit;

FIGURE 5 is a top plan view of the butchering unit showing the main conveyor belts for moving shrimp, and the butchering knives positioned between the two main belts;

FIGURE 6 is a side elevation of the apparatus shown in plan view in FIGURE 5;

FIGURE 8 is a top plan view similar to that of FIGURE 7 and somewhat reduced in scale and extending through the full length of the butchering unit but not illustrating the knives and other mechanism of the butchering unit;

FIGURE 12 is a side elevational view of the structure shown in plan in FIGURE 10;

FIGURE 13 is a side view of the main conveyor belt from the point where it receives a shrimp to be butchered to the point where the shrimp pass into the butchering unit;

FIGURE 14 is a plan view of the shrimp cleaning unit which is located on the discharge end of the butchering unit and showing the plurality of parallel rollers for removing the shell and cleaning the shrimp;

Figure 7:
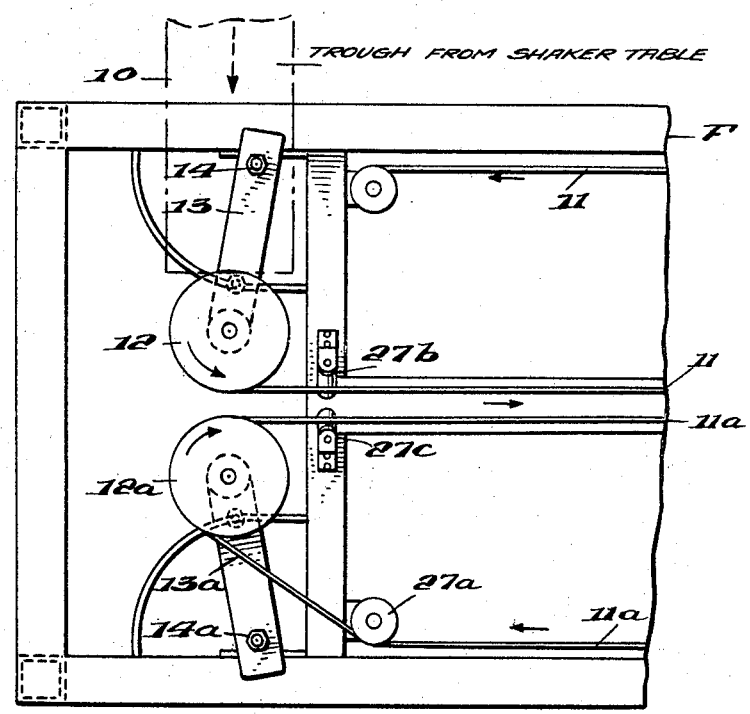
FIGURE 7 is a top plan view of the receiving portion of the belts in FIGURE 5 and somewhat enlarged.

Referring in detail to the several figures of the drawings, the several units of the apparatus are described as follows:

The shrimp distributing unit

It is important that each shrimp to be butchered and cleaned shall be fed to the butchering unit in a standard position, that is, never crosswise or transversely to the path of travel. Neither should the shrimp be passed to the butchering unit in a mass, but preferably one at a time. So the following apparatus features are used.

In FIGURE 1, 1 is a vibrating table on which beheaded shrimp are dropped in gradual and somewhat scattered regularities. The upper surface of the table is provided with a series of baffle plates 8. The table is inclined downwardly from its receiving end to its discharge end and is so mounted as to be vibrated as will now be explained. Two vertical and flexible supports 2 are connected to the upper end portion of the table and extend downwardly and are fixed at the lower ends in stationary supports 4. A similar pair of upright supports 3 are secured to the table 1 adjacent its lower end. Vibratory motion is provided by a motor 5 mounted on a cross-frame member 5ª midway between the supports 2 and 3. A pulley wheel 5ᵇ is mounted on a crossbar 6 extending between the frame members 2 and 3. Drive shafts 7 extend from the axle 5ᶜ on which the pulley 5ᵇ is mounted to the nearest side supports 2 and 3. These driving shafts are mounted eccentrically to provide the table 1 with a shaking motion. The combined effect of the action of the motor and the flexible mounting of the vibrating table 1 serves to separate the shrimp from each other and to pass them in a continuous stream down the vibrating table 1 to the lower end of the table. At the lowermost end of the table 1, there is a spring mounted finger 9 which serves to further separate one shrimp from the next shrimp and permit it to fall into the chute 10 from which it escapes to the receiving end of the butchering unit. In FIGURE 2 there is shown a top plan view of the vibrating table which is shown in FIGURE 1 in side elevation. In FIGURE 3 there is shown an end elevation looking from the left of FIGURE 2. The shrimp leaving the chute 10 move with considerable force and preferably also with a direction so that they leave the chute in one of four ways only, namely, back up, belly up, tail first, or tail last, but never sideways or transversely to the intended direction of travel.

In addition to the force gained by moving through the chute 10, the positioning of the shrimp when received by the main conveyor belt 11 is due to the fact that the main belt is formed of two separate belts providing a V-shaped space therebetween with the large end of the V facing upwardly as will be further explained in connection with the detailed description of the main conveyor belt.

Water is sprayed on the shrimp before being introduced to the upper end of the vibrating table 1 and constantly throughout the treatment from beginning to end.

The butchering unit

Figure 9:
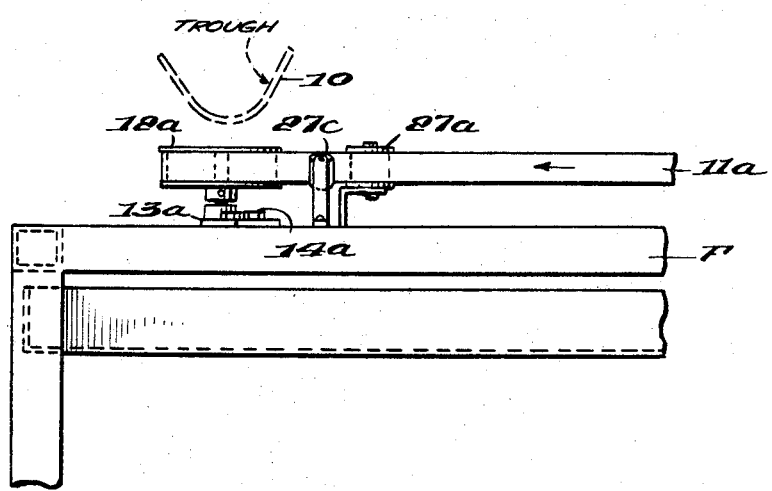
FIGURE 9 is a fragmentary side view of the belts shown in FIGURE 7.
Figure 10:
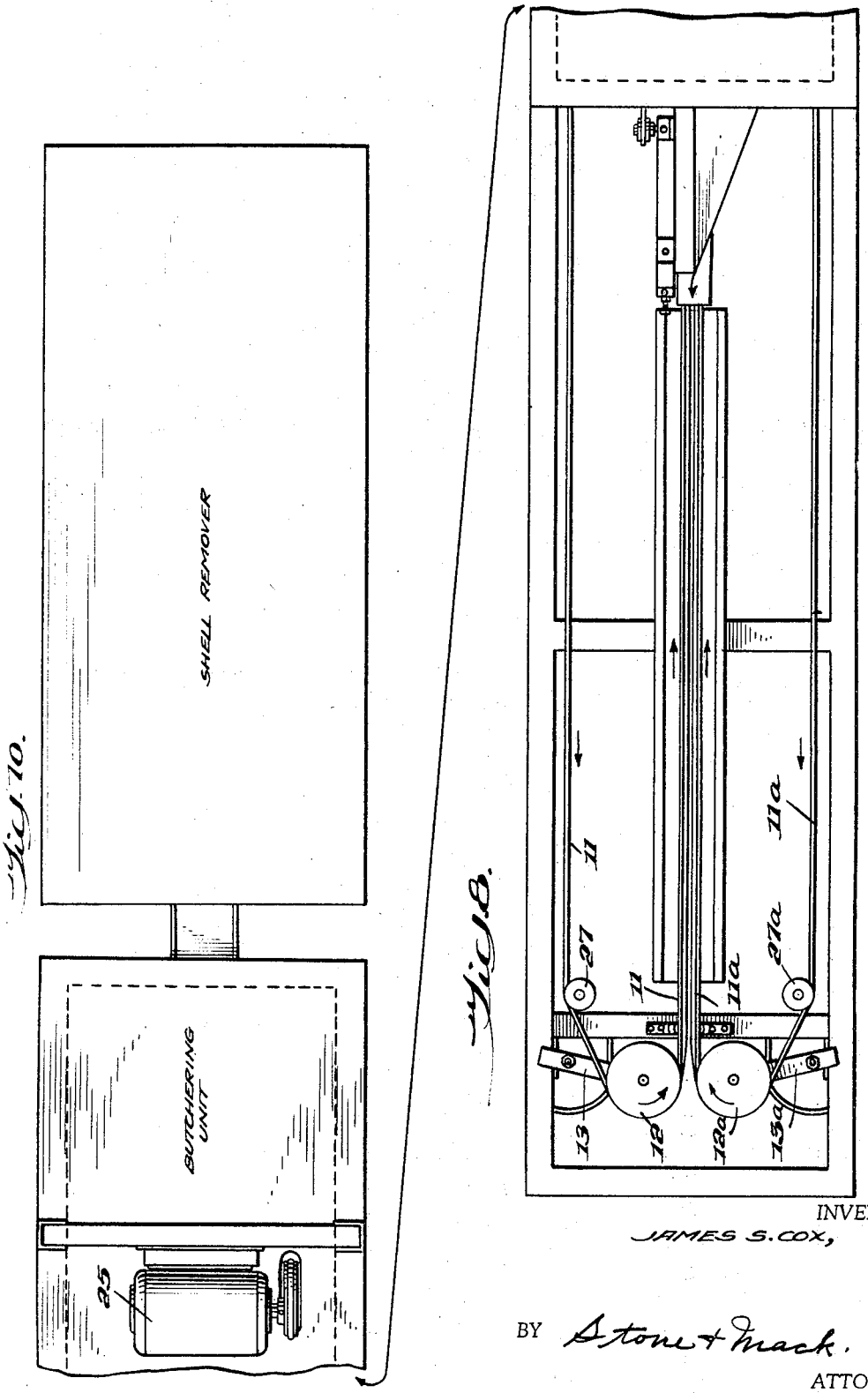
FIGURE 10 is a plan view showing a portion of the discharge end of the butchering unit leading to the shell removing and shrimp cleaning unit and showing the comparative area provided in the cleaning unit.
Figure 11:
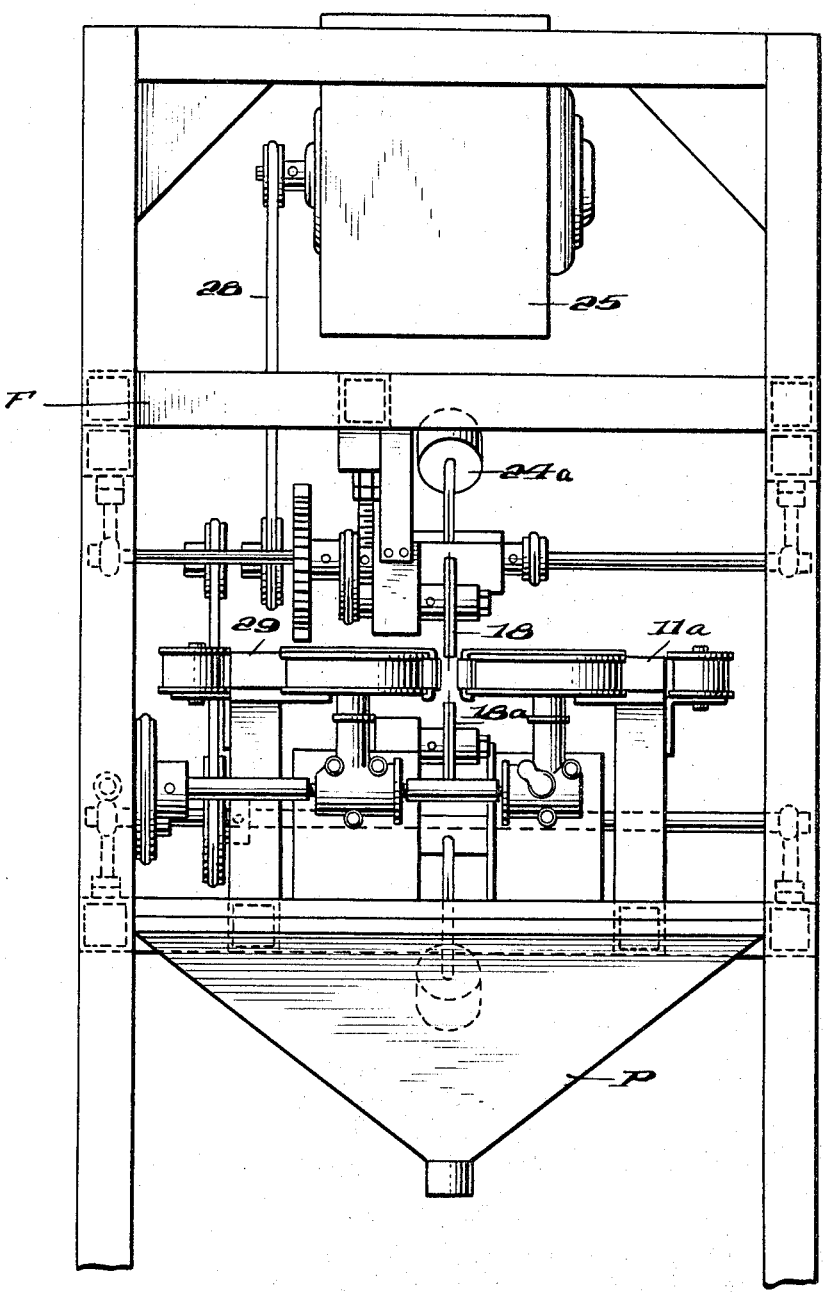
FIGURE 11 is an end view looking rearwardly from the discharge end of the butchering unit.

As indicated in the preceding paragraphs relating to the shrimp distributing unit, the shrimp are positioned on the two belts 11 and 11ª which together constitute the conveyor means whereby the individual shrimp are moved lengthwise of the butchering unit. Looking at FIGURE 5, which shows a top plan view of the two separate belts and the essentials of the apparatus in the butchering unit, the two belts are marked 11 and 11ª. At the receiving end, (see FIGURES 7, 8 and 9), the belts pass over the pulley wheels 12 and 12ª which are mounted on adjustable arms 13 and 13ª pivoted respectively to the opposite sides of the frame as indicated at 14 and 14ª. Adjustment of the arms 13 and 13ª on the pivot points 14 and 14ª enable tension to be applied to the belts 11 and 11ª. At the discharge end of the butchering unit the belts 11 and 11ª pass respectively over pulley wheels 15 and 15ª and thence over pulley wheels 16 and 16ª located in fixed positions adjacent the opposite side walls of the frame. (See FIGURE 5.) The belts 11 and 11ª run close together through the middle point of the machine and at that middle point there is located the butchering knife 17 and the companion floating disc or wheel 18, one of which is located at opposite sides of the butchering knife cutter blade 17. The uppermost cutter blade 17 is mounted on a driven shaft 19 which takes its power through a belt 20 driven from a pulley wheel 21 which in turn takes its power from a motor 30 located above the butchering unit. Adjusting means for varying the height of the cutter blade 17 is provided by a tilting rod 24 on which is mounted an adjustable weight 24ª. Spring means 24ᵇ extends from the frame F downwardly to press against the upper surface of the arm on which the cutter wheel 17 is mounted. A similar spring 24ᶜ extends upwardly from the frame to press against the lower side of the arm which carries the cutter wheel 17ª. The position of the weight 24ª lengthwise of the rod 24 regulates the depth of the cut by the uppermost of the two butchering knives which serves to control the cut by the upper blade 17. There is a corresponding regulating means, not shown, provided to regulate the cut of the blade 17ª on the under side of the shrimp. Power means from the shaft 21 is transmitted through a belt 22 running over a pulley wheel 23 to provide power for the shrimp flattener device (see FIGURES 5 and 6) for pushing down the shrimp just prior to the approach to the cutting blade.

Near the receiving end of these two sets of belts and between the shrimp distributing unit and the shrimp butchering unit there are two rollers 27ᵇ and 27ᶜ (FIGURE 7) engaging respectively belts 11 and 11ª set on a 45° angle against the back of each belt 11 and 11ª. These rollers cause the belt to twist, forming a V between the belts with the upper portion of the V facing upwardly. This V serves to receive shrimp from the chute.

As the belts move along, thus carrying the shrimp, they gradually straighten up into a vertical position as they go between two sets of rollers 26, (FIGURE 5), which push against the back of each belt 11 and 11ª, bringing them within one-fourth inch of each other. These rollers 26 are so designed as to permit the belts 11 and 11ª to approach each other or spread apart with the size and contour of each shrimp, and the combination of the rollers 26 and the two belts serve to center each shrimp with respect to the butchering knives 17 and 17ª. The rollers 26 are mounted, one each, on a series of spring held yieldable stub shafts 26ª. The lower end of the V- shaped space between the belts 11 and 11ª is open for the reception of the lowermost of two revolvable cutter blades 17ª.

Throughout the travel of the belts 11 and 11ª the surface of each belt is straight across its surface from top to bottom whether the belts are in the parallel relation or in the shape of a V.

The shrimp straightener

In FIGURE 6, in the middle portion of the figure, there is indicated a motor 30 which serves to provide power for the machine through a series of belts. The motor is mounted above and centrally with respect to the frame. Its drive is through a pulley wheel 31 over which there is looped a belt 32. The lower end of that belt passes around a wheel 33. A smaller wheel 34 is mounted on the same shaft which supports the pulley wheel 33 and from the wheel 34 a power take-off is continued through the belt 35 and around a lower pulley wheel 36 from which power is carried to the lower cutter blade 17ª. Power to the upper cutter blade 17 is taken off from the motor 30 through the belt 32 and short belt, not shown, leading from the axle on which the pulley wheel 34 is mounted. A separate take-off for power leads from the pulley wheel 36 through a belt 37 to pulley wheel 38.

In between the arms 90 which support the two cutting blades 17 and 17ª is a connecting member 40 which serves to regulate the depth of cut of each blade 17 and 17ª so as to have their respective depths of cut equal.

In between the shrimp distributing unit and the butchering unit there is a shrimp straightener unit which includes a belt 41 which extends over and around two pulley wheels 42 and 43. The belt passes above and closely adjacent the main conveyor belt which consists of the two companion belts 11 and 11ª. As shown in FIGURE 6, the drive belt 22 from the butchering unit passes around a pulley wheel 23 concentric with the pulley wheel 43. The belt 41 runs with fairly high speed over the belts 11 and 11ª. This assembly is called the shrimp straightener. The pulley at the receiving end faces the shrimp as they enter between the belts 11 and 11ª and the purpose of the belt 41 is to flatten shrimp down quickly as they are moved along. The wheel 42 may be somewhat higher from the belts 11 and 11ª than the pulley wheel 43 thus to provide ease for the shrimp to enter beneath the belt 41. Or optionally the pulley 42 may be somewhat greater in diameter than the wheel 43.

I claim:

1. In a shrimp butchering apparatus, means for positioning and transporting individual shrimp bodies, two rotatable cutter blades positioned one above the other and adapted to cut respectively the under surface and the upper surface of a shrimp body moving therebetween, each of said cutter blades being carried by an arm permitting the blades to be moved upwardly or downwardly to follow the contour of each shrimp, means interconnecting said arms to permit the blades to be adjustably spaced apart in accordance with the size of shrimp being butchered, and drive means associated with each said cutter blade.

2. In a shrimp butchering apparatus, means for positioning and transporting individual shrimp bodies, two rotatable cutter blades positioned one above the other and adapted to cut respectively the under surface and the upper surface of a shrimp body moving therebetween, each of said cutter blades being carried by an arm permitting the blades to be moved upwardly or downwardly to follow the contour of each shrimp, means interconnecting said arms to permit the blades to be adjustably spaced apart in accordance with the size of shrimp being butchered, and drive means associated with each said cutter blade, said means for positioning and transporting shrimp bodies comprising a pair of belts adapted to travel parallel to each other and to hold individual shrimp bodies therebetween, supporting elements bracing said belts and holding them toward each other, and means associated with each belt to twist the same and thereby form a V-shaped space within which to receive shrimp, the side walls of which are straight across its surface from top to bottom and the lower end of which is open for the reception of the lowermost of said two rotatable cutter blades.

3. In a shrimp butchering apparatus, means for positioning and transporting individual shrimp bodies, two rotatable cutter blades positioned one above the other and adapted to cut respectively the under surface and the upper surface of a shrimp body moving therebetween, each of said cutter blades being carried by an arm permitting the blades to be moved upwardly or downwardly to follow the contour of each shrimp, means interconnecting said arms to permit the blades to be adjustably spaced apart in accordance with the size of shrimp being butchered, and drive means associated with each said cutter blade, said means for positioning and transporting shrimp bodies comprising a pair of belts adapted to travel parallel to each other and to hold individual shrimp bodies therebetween, supporting elements bracing said belts and holding them toward each other, and means associated with each belt to twist the same and thereby form a V-shaped space within which to receive shrimp, and a roller overhanging said belts and adapted to push down on any shrimp projecting above the belts, the side walls of said V-shaped space being straight across its surface from top to bottom and the lower end of which is open for the reception of the lowermost of said two rotatable cutter blades.

References Cited

UNITED STATES PATENTS

| | | | |
|---|---|---|---|
| 2,626,701 | 1/1953 | Avetta et al. | 17—2 X |
| 2,659,930 | 11/1953 | Jagger | 17—2 |
| 2,845,654 | 8/1958 | Deal | 17—2 |
| 2,974,356 | 3/1961 | Cerny | 17—2 |
| 3,080,605 | 3/1963 | Welcher et al. | 17—2 |
| 3,122,777 | 3/1964 | Jonsson | 17—2 |

LUCIE H. LAUDENSLAGER, *Primary Examiner.*